(12) United States Patent
Katsurahira et al.

(10) Patent No.: US 11,061,515 B2
(45) Date of Patent: Jul. 13, 2021

(54) POSITION INDICATOR

(71) Applicant: Wacom Co., Ltd., Saitama (JP)

(72) Inventors: Yuji Katsurahira, Saitama (JP); Hideyuki Hara, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/828,569

(22) Filed: Mar. 24, 2020

(65) Prior Publication Data
US 2020/0225779 A1    Jul. 16, 2020

Related U.S. Application Data

(63) Continuation of application No. PCT/JP2018/030381, filed on Aug. 16, 2018.

(30) Foreign Application Priority Data

Sep. 27, 2017    (JP) .............................. JP2017-186415

(51) Int. Cl.
*G06F 3/044*    (2006.01)
*G06F 3/041*    (2006.01)
*G06F 3/0354*    (2013.01)

(52) U.S. Cl.
CPC ........ *G06F 3/0442* (2019.05); *G06F 3/03545* (2013.01); *G06F 3/04162* (2019.05)

(58) Field of Classification Search
CPC . G06F 3/04162; G06F 3/0442; G06F 3/03545
See application file for complete search history.

(56) References Cited

U.S. PATENT DOCUMENTS

| 2014/0043301 | A1  | 2/2014 | Katsurahira |
|---|---|---|---|
| 2015/0193025 | A1  | 7/2015 | Rebeschi et al. |
| 2017/0262071 | A1* | 9/2017 | Chang ..................... G06F 3/038 |
| 2018/0196574 | A1* | 7/2018 | Case, Jr. ............... G06F 3/0446 |
| 2019/0050072 | A1  | 2/2019 | Munakata et al. |
| 2019/0235647 | A1* | 8/2019 | Chang ................. G06F 3/04186 |

FOREIGN PATENT DOCUMENTS

| JP | 2014-35631 A | 2/2014 |
|---|---|---|
| JP | 2016-126503 A | 4/2016 |

OTHER PUBLICATIONS

Extended European Search Report, dated Oct. 16, 2020, for European Application No. 18861050.5, 7 pages.
International Search Report, dated Sep. 11, 2018, for International Application No. PCT/JP2018/030381, 2 pages.

* cited by examiner

*Primary Examiner* — Muhammad N Edun
(74) *Attorney, Agent, or Firm* — Seed IP Law Group LLP

(57) ABSTRACT

A position indicator has a pen-like appearance and interacts capacitively with a sensor of a position detection apparatus. The position indicator includes: a housing; a first electrode and a second electrode that are arranged at one end of the housing in an axial center direction thereof, wherein the second electrode encircles the first electrode, and first electrode is partially exposed from the housing in the axial center direction of the housing; and a signal transmission control circuit that supplies at least the first electrode with a first signal, wherein the first electrode outputs the first signal to interact capacitively with the sensor. The signal transmission control circuit is further configured to cause the second electrode to output a second signal that cancels out the first signal output from the first electrode.

7 Claims, 8 Drawing Sheets

POSITION INDICATOR

BACKGROUND

Technical Field

The present disclosure relates to a position indicator that operates by a capacitance method to interact capacitively with a sensor of a position detection apparatus.

Background Art

There exist known active capacitive pens each acting as a position indicator of the above-mentioned type operating by the capacitance method, the position indicator having a signal transmission circuit that transmits a signal via a conductive stylus to a sensor of a position detection apparatus through capacitive coupling. In this case, the position detection apparatus receives a signal from the active capacitive pen via the sensor that includes multiple sensor conductors. The position detection apparatus detects the position on the sensor that is pointed by a pen tip of a stylus of the active capacitive pen in accordance with a signal level on the sensor conductors having received the signal.

When the axial center direction of the stylus is perpendicular to an input surface of the sensor, the position detection apparatus can detect the position pointed by the pen tip of the stylus with substantial accuracy. One problem is that when the axial center direction of the stylus is tilted relative to the input surface of the sensor, the position detection apparatus cannot accurately detect the position pointed by the pen tip of the stylus.

FIGS. 11A and 11B are views explaining a relationship between the tilt angles of the axial center direction of the stylus of the position indicator relative to the input surface of the sensor on one hand and the signal levels of the signal received by the sensor of the position detection apparatus from the position indicator on the other hand. FIGS. 11A and 11B illustrate the signal levels of the signal received by multiple conductors (conductors Xi−2, Xi−1, Xi, Xi+1, and Xi+2 in the examples of FIGS. 11A and 11B) arranged in an X-axis direction (e.g., crosswise direction) of the sensor. The sensor has multiple conductors arranged likewise in a Y-axis direction as well. Similar signal levels also appear on these conductors arranged in the Y-axis direction.

FIG. 11A indicates the signal levels of the signal received by the conductors Xi−2, Xi−1, Xi, Xi+1, and Xi+2 in a case where the axial center direction of a stylus 100 of the position indicator is perpendicular to the input surface of the sensor of the position detection apparatus and where the stylus 100 (i.e., its pen tip) is directly above the conductor Xi. In this case, the signal from the stylus 100 is transmitted substantially from the tip of the stylus to the sensor. As a result, the signal level of the signal received by each of the conductors Xi−2, Xi−1, Xi, Xi+1 and Xi+2 is highest on the conductor Xi at the center and is progressively lower on the conductors Xi−2 and Xi−1 to the left of the conductor Xi and on the conductors Xi+1 and Xi+2 to the right thereof in a symmetrical manner, as illustrated in FIG. 11A.

The position detection apparatus detects the position on the sensor pointed by the stylus 100 by performing calculations using the signal levels of the signal received by the conductors Xi−2, Xi−1, Xi, Xi+1, and Xi+2. In the case of FIG. 11A, a position P0 (X coordinate) pointed by the stylus 100 is detected correctly as the position of the conductor Xi.

On the other hand, FIG. 11B depicts the signal levels of the signal received by the conductors Xi−2, Xi−1, Xi, Xi+1, and Xi+2 in a case where the pen tip of the stylus 100 of the position indicator is directly above the conductor Xi but where the stylus 100 is tilted relative to the input surface of the sensor of the position detection apparatus at a predetermined angle $\theta(\theta<90$ degrees) in the X-axis direction. In this case, the signal from the stylus 100 is transmitted to the sensor not only from the stylus tip but also effectively from a stylus portion close to the sensor in keeping with the tilt. As a result, the signal level of the signal received by each of the conductors Xi−2, Xi−1, Xi, Xi+1 and Xi+2 is highest on the conductor Xi at the center and is progressively lower on the conductors Xi−2 and Xi−1 to the left of the conductor Xi and on the conductors Xi+1 and Xi+2 to the right thereof in an asymmetrical manner in keeping with the tilt of the stylus 100, as depicted in FIG. 11B.

The position detection apparatus detects the position pointed by the stylus 100 by performing calculations using the signal levels of the signal received by the conductors Xi−2, Xi−1, Xi, Xi+1, and Xi+2 in the state in FIG. 11B. Consequently, the position pointed by the stylus 100 is shifted to a position P1 in the direction in which the stylus 100 is tilted by the amount reflecting the tilt angle. The position P1 deviates by $\Delta P$ from the position P0 pointed by the tip of the stylus 100.

Methods have been proposed to solve the problem of the shift in the position pointed by the pen tip of the stylus of the position indicator reflecting the tilt of the latter. The proposed methods, such as the detection method disclosed in Patent Document 1 and the detection method disclosed in Patent Document 2, propose detecting the tilt angle of the position indicator relative to the input surface of the sensor (i.e., tilt angle of the stylus in the axial center direction) and, by use of the result of the detection, correcting the detected position pointed by the pen tip of the stylus of the position indicator.

PRIOR ART DOCUMENT

Patent Documents

Patent Document 1: Japanese Patent Laid-open No. 2014-35631

Patent Document 2: Japanese Patent Laid-open No. 2016-126503

BRIEF SUMMARY

Technical Problem

However, a configuration for detecting the tilt angle is needed with the proposed methods that involve detecting the tilt angle of the position indicator with respect to the input surface of the sensor and, by use of the result of the detection, correcting the detected position pointed by the pen tip of the stylus of the position indicator. This poses the problem of complicating the configuration of the position indicator and raising its manufacturing cost as well.

It is an object of the present disclosure to provide a position indicator that solves the above problem.

Technical Solution

In order to solve the above problems, the present disclosure provides a position indicator including a housing, a first electrode, a second electrode, and a signal transmission control circuit, the first electrode and the second electrode being arranged at one end of the housing in an axial center direction thereof, wherein the second electrode encircles the first electrode, and the first electrode is partially exposed in the axial center direction of the housing, the signal transmission control circuit supplies at least the first electrode with a first signal, wherein the first electrode outputs the first signal to interact capacitively with a sensor of a position detection apparatus. The signal transmission control circuit is configured to cause the second electrode to output a second signal that cancels out the first signal output from the first electrode.

According to the position indicator of the above configuration, even if the axial center direction of the stylus is tilted relative to the input surface of the sensor of the position detection apparatus, the coordinates of the position pointed by the pen tip of the stylus are prevented from being shifted on the part of the position detection apparatus.

MODES FOR CARRYING OUT THE DISCLOSURE

Some embodiments of the position indicator according to the present disclosure are described below with reference to the accompanying drawings.

First Embodiment

Figure 1:
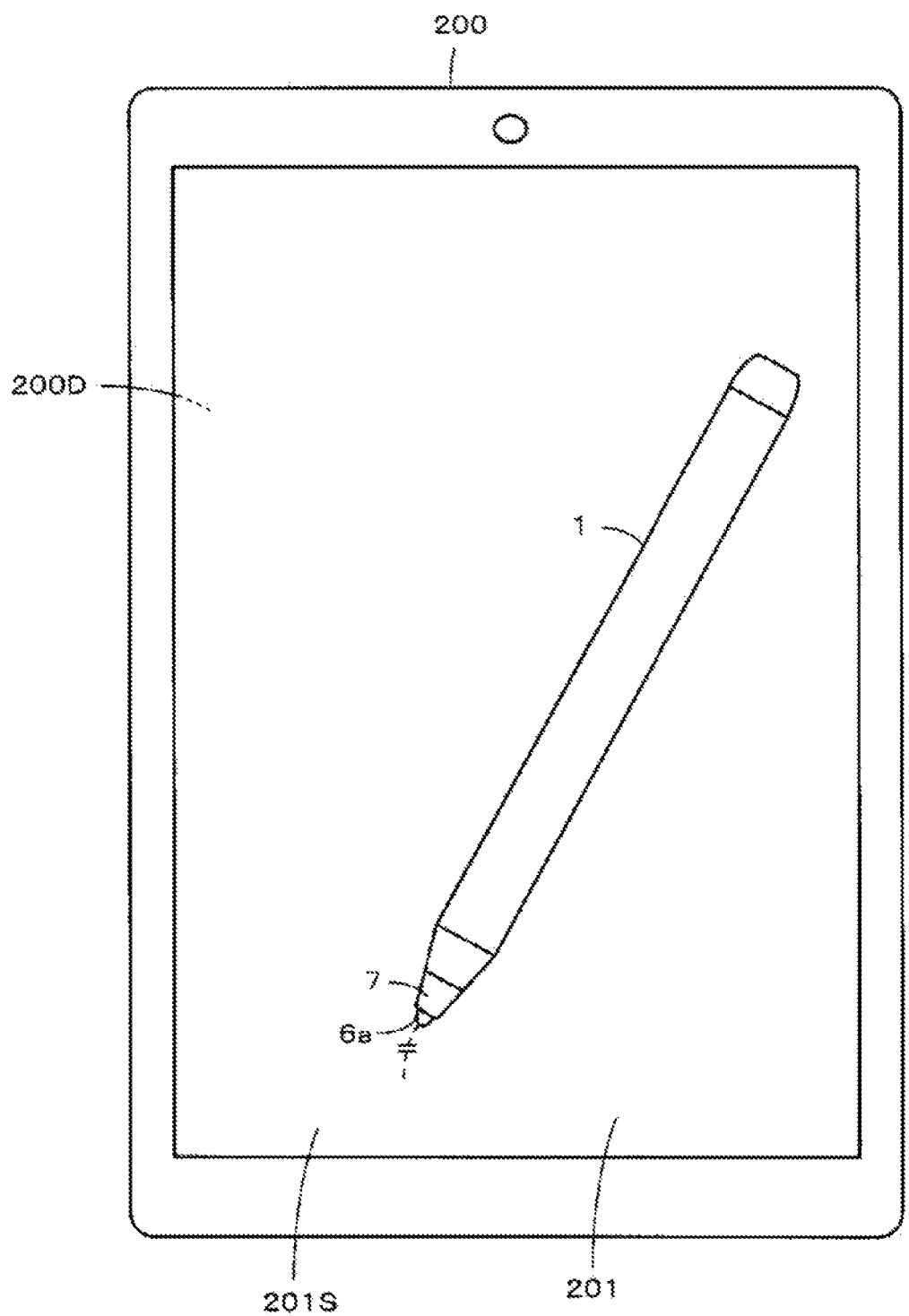
FIG. 1 is a view depicting an example of a tablet type information terminal as a typical electronic device that uses a position indicator as a first embodiment of the present disclosure.

FIG. 1 depicts an example of a tablet type information terminal 200 as a typical electronic device that uses a position indicator 1 as an embodiment of the present disclosure. In this example, the tablet type information terminal 200 includes a display screen 200D of a display apparatus such as an LCD (Liquid Crystal Display). The upper side of the display screen 200D (surface side) includes a sensor of a position detection apparatus 201 operating by the capacitance method.

Using the position indicator 1, an operator points to a position on an input surface 201S of the sensor of the position detection apparatus 201 in the tablet type information terminal 200. The position detection apparatus 201 detects the position pointed by the position indicator 1 on the sensor of the position detection apparatus 201.

[Explanation of an Exemplary Mechanical Configuration of the Position Indicator 1 as the Embodiment]

Figure 2:
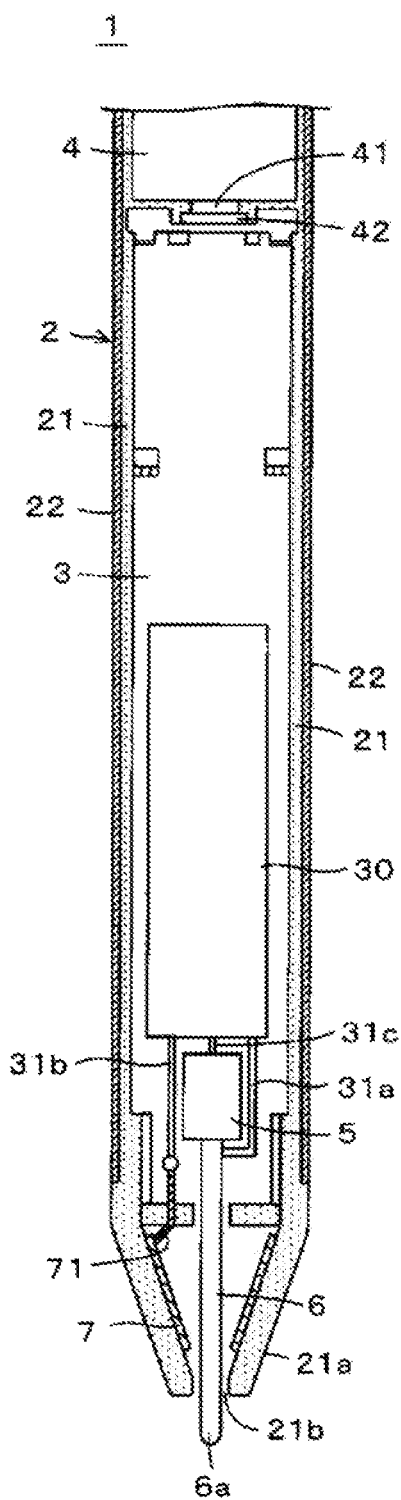
FIG. 2 is a view explaining an exemplary configuration of the position indicator as the first embodiment of the present disclosure.

FIG. 2 is a view explaining an exemplary configuration of the position indicator 1 as the first embodiment of the present disclosure. This view is primarily a partial longitudinal sectional view of the pen tip side. In this embodiment, the position indicator 1 is configured to have a pen-like appearance.

[Explanation of an Exemplary Structural Configuration of the Position Indicator as the First Embodiment]

The position indicator 1 of this embodiment has a pen-like housing 2. The housing 2 is configured, for example, using a hollow cylindrical insulator section 21 constituted by an insulating material such as a synthetic resin. With this embodiment, at least that portion of an outer periphery of the insulator section 21 that is held by the operator along the housing 2 is covered with a conductor section 22 made of a metal, for example.

Inside the housing 2 are a printed circuit board 3, a battery 4 serving as a power supply circuit, and a writing pressure detector 5. The conductor section 22 covering the outer periphery of the housing 2 is electrically connected with a ground conductor, not depicted, of the printed circuit board 3. The battery 4 may be a dry cell, a rechargeable storage cell, or a power supply circuit that includes a capacitor such as an electric double layer capacitor, to be discussed later.

A signal transmission control circuit 30 and other electronic components and wiring patterns, not depicted, are arranged on the printed circuit board 3. The signal transmission control circuit 30 generates a position detection signal and additional information and outputs the generated position detection signal and additional information from the position indicator 1.

The battery 4 is a power source that supplies power to the electronic circuits and electronic components configured on the printed circuit board 3. A terminal 42 is connected electrically with a power supply circuit section on the printed circuit board 3. A positive electrode 41 of the battery 4 is in contact with the terminal 42 for electrical connection therebetween. A negative electrode of the battery 4, not depicted, is either directly connected with the ground conductor of the printed circuit board 3 or pressed into contact with an elastically deformable terminal connected with the ground conductor of the printed circuit board 3 via the conductor section 22 of the housing 2.

In this embodiment, the writing pressure detector 5 is configured as a variable capacitance capacitor with its capacitance varying with the amount of writing pressure applied to a stylus 6. In FIG. 2, the electrodes at both ends of the variable capacitance capacitor constituted by the writing pressure detector 5 are connected to the signal transmission control circuit 30 via a conductive pattern 31c.

The stylus 6 is latched inside a hollow space of the housing 2 of the position indicator 1 when the end of the stylus 6 opposite to the pen tip protruding out of the housing 2 is fitted into the writing pressure detector 5 installed in the hollow space of the housing 2. The stylus 6 is configured to be disengaged from the writing pressure detector 5 when pulled out. That is, the stylus is replaceable for the position indicator 1.

The stylus 6 is constituted by a conductor such as a hard resin in which metal and conductor powder are mixed. The stylus 6 is electrically connected with the signal transmission control circuit 30 via a conductive pattern 31a. The stylus 6 is configured in such a manner that the position detection signal and additional information generated by the signal transmission control circuit 30 are output to the sensor of the position detection apparatus 201 via the stylus 6 (center electrode) constituted by the conductor.

One end part the hollow cylindrical insulator section 21 in its center line direction constituting the housing 2 is a cylindrical tapered section 21a that is tapered toward its tip. A tapered cylindrical cone-shaped ring electrode 7 is attached to an inner wall surface of the cylindrical tapered section 21a in such a manner that the ring electrode 7 acting as a peripheral electrode encircles partially the stylus 6 as the center electrode in the axial center direction of the housing 2. In other words, the ring electrode 7 is arranged together with the housing 2 to encircle the stylus 6 in such a manner that a tip part of the stylus 6 is partially exposed. The ring electrode 7 forms a ring-like conductor constituted by a conductive member, for example. In this case, the ring electrode 7 is covered by the tapered section 21a of the insulator section 21 in the housing 2, so that the operator of the position indicator 1 does not directly touch the ring electrode 7. Incidentally, the ring electrode 7 as the peripheral electrode is not limited to a conical shape and may have a cylindrical shape or a ring-like shape.

Also, the ring electrode 7 is connected electrically with a conductor pattern 31b of the printed circuit board 3 via a lead conductor member 71 penetrating through the insulator section 21. In this example, the conductor pattern 31b is connected with the signal transmission control circuit 30. The signal transmission control circuit 30 is configured in such a manner that a signal opposite in phase to the signal from the stylus 6 is output from the ring electrode 7. With this embodiment, as will be discussed later, the ring electrode 7 is connected to a part where a reference potential of the printed circuit board 3 appears via a coil 303, i.e., connected to the ground conductor in this example (see FIG. 3).

In this embodiment, the stylus 6 is arranged in a hollow space of the insulator section 21 in such a manner that a tip part 6a of the stylus 6 protrudes out of an opening 21b of the tapered section 21a of the insulator section 21 in the housing 2 and that the part opposite to the tip part 6a is fitted into the writing pressure detector 5. That is, the center electrode (stylus 6) and the peripheral electrode (ring electrode 7) are arranged in the axial center direction of the housing 2, with the center electrode encircled partially by the peripheral electrode in the axial center direction.

In the example of FIG. 2, the ring electrode 7 is attached to the inner wall surface of the tapered section 21a of the insulator section 21, so that the pen tip part 6a of the stylus 6 is projected externally without being encircled by the ring electrode 7.

That is, the ring electrode 7 encircling the stylus 6 is arranged with this embodiment in such a manner as to encircle the stylus circumference excluding a coupling portion between the pen tip part 6a and the writing pressure detector 5.

The signal transmission control circuit 30 includes a circuit that generates the signal to be output to the sensor of the position detection apparatus 201 via the stylus 6, and a circuit that generates another signal opposite in phase to the signal to be output from the stylus 6.

[Explanation of an Exemplary Configuration of the Signal Transmission Control Circuit 30 in the Position Indicator 1 of the First Embodiment]

Figure 3:
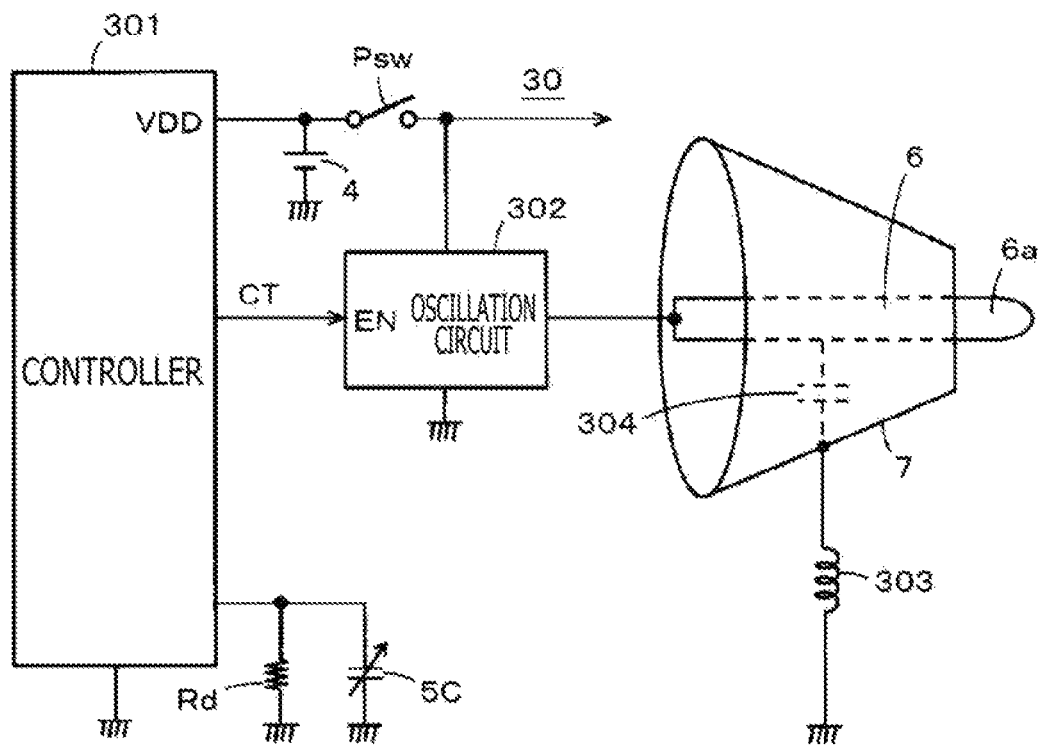
FIG. 3 is a block diagram depicting an exemplary configuration of a signal transmission control circuit of the position indicator as the first embodiment of the present disclosure.

FIG. 3 is a circuit configuration diagram of the signal transmission control circuit 30 in the position indicator 1 of this embodiment. In this example, the signal transmission control circuit 30 includes a controller 301, an oscillation circuit 302 that generates the signal to be supplied to the stylus 6, and a coil 303 that outputs from the ring electrode 7 the signal that is opposite in phase to the signal output from the stylus 6. That is, the signals generated by the oscillation circuit 302 are supplied to the stylus 6 as well as to the ring electrode 7 via a stray capacitance 304 formed between the stylus 6 and the ring electrode 7. Thus, the embodiment includes the coil 303 that causes the signal output from the ring electrode 7 to be opposite in phase to the signal output from the stylus 6.

The controller 301, configured with a microprocessor, for example, constitutes a control circuit that controls processing operations, to be discussed later, of the signal transmission control circuit 30 in the position indicator 1. The controller 301 is supplied with a power supply voltage VDD from the battery 4 acting as a typical drive power supply. The controller 301 controls the oscillation circuit 302. The power supply voltage VDD from the battery 4 is supplied via a power switch Psw to the signal transmission control circuit 30 and to other circuits. The power switch Psw, not depicted in FIGS. 1 and 2, has an operating element disposed on a side surface of the housing 2, the operating element being turned on and off when pressed.

The controller 301 is also connected with a variable capacitance capacitor 5C configured using the writing pressure detector 5. The controller 301 monitors the capacitance of the variable capacitance capacitor 5C in order to detect the writing pressure applied to the stylus 6 of the position indicator 1. In this embodiment, that is, a discharging resistor Rd is connected with the variable capacitance capacitor 5C. The controller 301 detects the capacitance of the variable capacitance capacitor 5C by measuring a discharge time from the time the variable capacitance capacitor 5C is fully charged until it is discharged down to a predetermined end-to-end voltage. From the detected capacitance, the controller 301 detects the writing pressure.

The oscillation circuit 302 generates an alternating-current signal with a frequency f1=1.8 MHz, for example. The oscillation circuit 302 is supplied with the power supply voltage VDD from the battery 4 via the power switch Psw. A continuous wave of the alternating-current signal i.e., a burst signal, from the oscillation circuit 302 over a predetermined time period constitutes a position detection signal to be output to the sensor via the stylus 6.

The controller 301 causes the oscillation circuit 302 to generate the above-mentioned burst signal and an ASK (Amplitude Shift Keying) modulated signal by supplying a control signal (enable signal CT) to an enable terminal EN of the oscillation circuit 302 for on/off control of the oscillation circuit 302. In response to the enable signal CT from the controller 301, the oscillation circuit 302 generates the alternating-current signal intermittently. This is how the oscillation circuit 302 generates the burst signal and the ASK-modulated signal. In this embodiment, the controller 301 converts information regarding the writing pressure value detected as described above into a digital signal, and controls the oscillation circuit 302 in accordance with the digital signal. The controller 301 thus causes the oscillation circuit 302 to output the writing pressure value information as the ASK-modulated signal.

The output terminal of the oscillation circuit 302 is connected with the conductive stylus 6 in this embodiment. The alternating-current signal from the oscillation circuit 302 is output to the sensor of the position detection apparatus 201 via the stylus 6.

Figure 4:
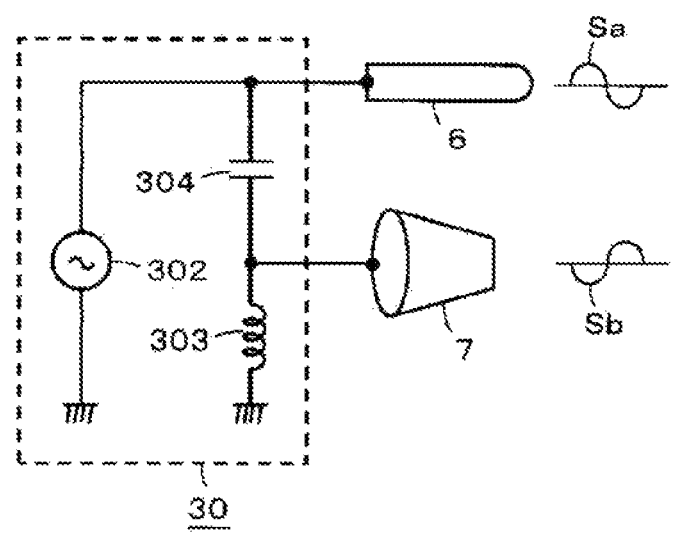
FIG. 4 is a view depicting an equivalent circuit of the signal transmission control circuit in FIG. 3.

The ring electrode 7 is connected with the ground conductor (ground) via the coil 303. In this case, the ring electrode 7 encircling the stylus 6 is connected with the latter through the stray capacitance 304 therebetween. Consequently, an equivalent circuit of the signal transmission control circuit 30 is formed as depicted in FIG. 4, enclosed by dotted lines. The signal generated by the oscillation circuit 302 is thus supplied to the stylus 6 as well as to the ring electrode 7 through capacitive coupling based on the stray capacitance 304. An alternating-current signal Sa from the stylus 6 is output from the ring electrode 7 as an alternating-current signal Sb inverted in phase by the coil 303.

That is, the signal transmission control circuit 30, which includes the oscillation circuit 302, causes a first signal and a second signal generated by the oscillation circuit 302 to be supplied to the stylus 6 (center electrode) and to the ring electrode 7 (peripheral electrode), respectively. The signal transmission control circuit 30 controls the signal output from the stylus 6 and the signal output from the ring electrode 7 in such a manner that the phases of these signals cancel each other (in an opposite phase relation). Further, the signal transmission control circuit 30 controls these signals to be in a predetermined amplitude level relation to each other such that the signals have their phases effectively cancelled out each other.

Figure 5:
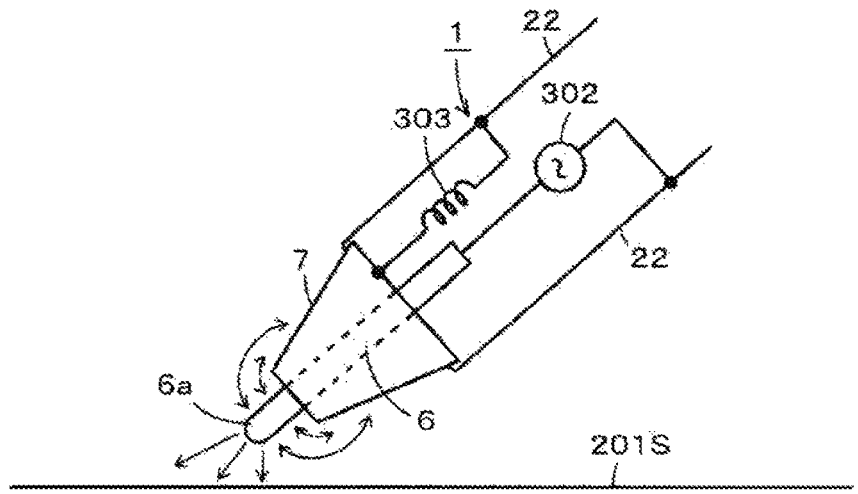
FIG. 5 is a view explaining the relationship between the signal output from the position indicator as the first embodiment of the present disclosure on one hand and a position detection apparatus on the other hand.

Consequently, as depicted in FIG. 5, the output signal from the oscillation circuit 302 of the position indicator 1 is output, with its intensity substantially intact, from the tip part 6a of the stylus 6 to the input surface 201S of the sensor of the position detection apparatus 201. However, the output signal from the oscillation circuit 302 is scarcely received by the sensor when output from that portion of the stylus 6 encircled by the ring electrode 7 and from that portion of the tip part 6a close to the ring electrode 7, because the signal is cancelled by the opposite-phase signal from the ring electrode 7. As a result, as depicted in FIG. 5, even if the axial center direction of the stylus 6 of the position indicator 1 is tilted relative to the input surface 201S of the sensor of the position detection apparatus 201, the position detection apparatus 201 can accurately detect the non-shifted position pointed by the tip part 6a of the stylus 6.

In this case, the inductance value of the coil 303 is adjusted to a value such that even if the axial center direction of the stylus 6 of the position indicator 1 is tilted relative to the input surface 201S of the sensor of the position detection apparatus 201, the position detection apparatus 201 can correctly detect the position pointed by the tip part 6a of the stylus 6.

In other words, by adjusting the inductance value of the coil 303, it is possible to adjust the intensity of the signal which is output from the ring electrode 7 and of which the phase is opposite to that of the signal output from the stylus 6. This eliminates the need for extending the ring electrode 7 up to near the tip part 6a of the stylus 6, allowing the ring electrode 7 to be positioned as desired. This in turn reduces constraints on the external design of the position indicator.

Obviously, it is possible to adjust how much the tip part 6a of the stylus 6 is allowed to protrude from the ring electrode 7 so as to regulate the intensity of the signal which is output from the ring electrode 7 and which is opposite in phase to the signal from the stylus 6.

Whereas the stray capacitance 304 is virtually connected interposingly between the stylus 6 and the ring electrode 7 in the equivalent circuit of FIG. 4, a capacitor may actually be connected interposingly between the stylus 6 and the ring electrode 7, with the capacitance of the capacitor adjusted to a value that allows the position detection apparatus accurately to detect the position pointed by the tip part 6a of the stylus 6. In this case, the capacitance of the capacitor actually connected interposingly between the stylus 6 and the ring electrode 7 may be adjusted instead of, or in conjunction with, adjusting the inductance value of the coil 303.

With the above-described position indicator 1, the conductor section 22 is arranged to cover at least that portion of the outer periphery, held by the operator, of the insulator section 21 of the housing 2. However, the conductor section 22 is not mandatory and may be omitted.

[Explanation of and Exemplary Configuration of the Position Detection Apparatus 201]

Figure 6:
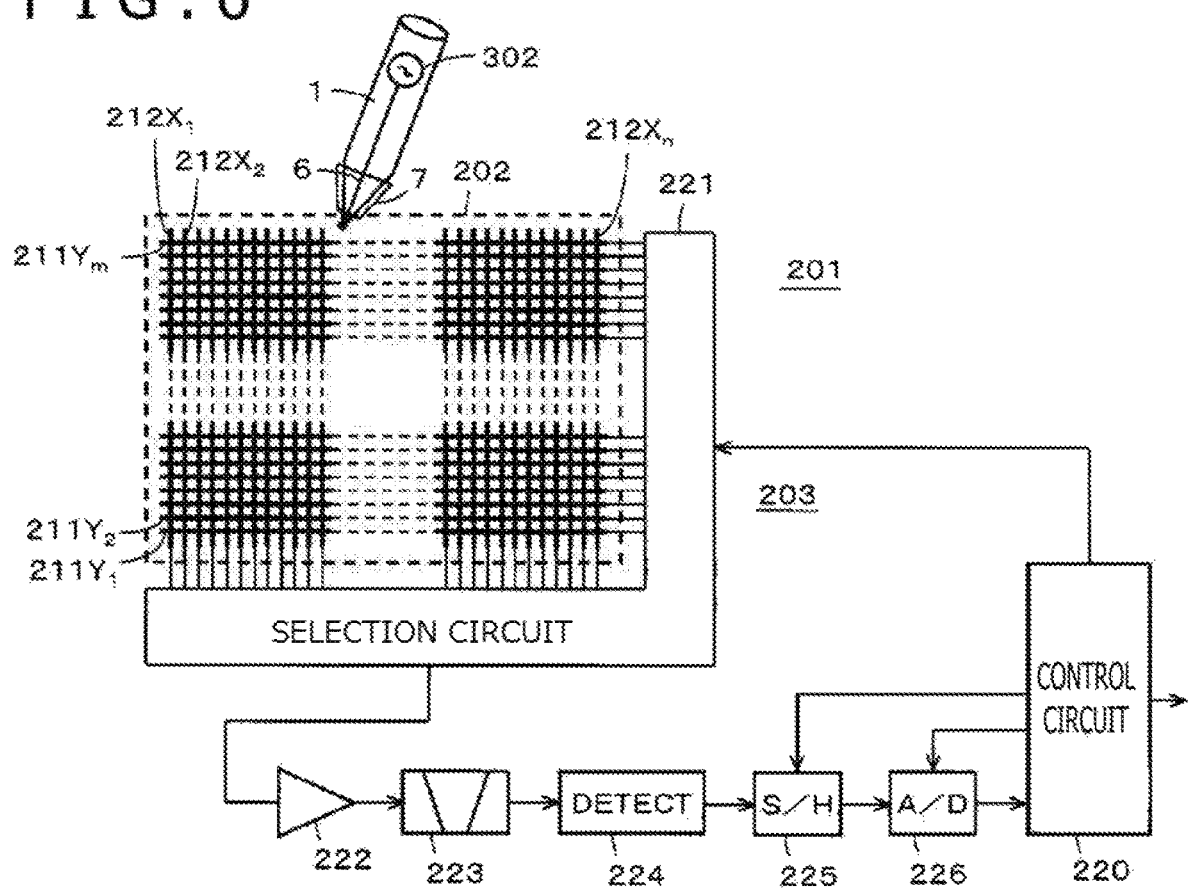
FIG. 6 is a view explaining an exemplary configuration of the position detection apparatus for use with the position indicator according to the present disclosure.

The position detection apparatus 201 of this embodiment includes, as depicted in FIG. 6, a sensor 202 constituting the position detection apparatus 201 and a pen pointing detection circuit 203 connected with the sensor 202.

In this example, with no sectional view provided, the sensor 202 is configured with a first conductor group 211, an insulating layer (not depicted), and a second conductor group 212 stacked from the bottom up in that order. The first conductor group 211 has multiple first conductors $211Y_1$, $211Y_2$, $211Y_m$ (m is an integer of 1 or more) each extending in the crosswise direction (X-axis direction), for example, the first conductors being arranged in parallel a predetermined distance apart from each other in the Y-axis direction.

The second conductor group 212 has multiple second conductors $212X_1$, $212X_2$, ..., $212X_n$ (n is an integer of 1 or more) each extending in a direction intersecting with the extending direction of the first conductors $211Y_1$, $211Y_2$, ..., $211Y_m$, i.e., each extending in the perpendicular lengthwise direction (Y-axis direction) in this example, the second conductors being arranged in parallel a predetermined distance apart from each other in the X-axis direction.

As described above, the sensor 202 of the position detection apparatus 201 is configured to detect the position pointed by the position indicator 1 through the use of a sensor pattern formed by the first conductor group 211 and the second conductor group 212 intersecting with each other.

In the description that follows, the first conductors $211Y_1$, $211Y_2$, ..., $211Y_m$ will be collectively referred to as the first conductors 211Y where there is no need to distinguish the individual conductors. Likewise, the second conductors $212X_1$, $212X_2$, $212X_n$ will be collectively referred to as the second conductors 212X where there is no need to distinguish the individual conductors.

The sensor 202 of the position detection apparatus 201 of this embodiment includes a sensor surface (pointing input surface) 200 whose size is comparable to that of the display screen of an electronic device such as a tablet type information terminal. The sensor 202 is configured with the first conductor group 211 and second conductor group 212 that are optically transparent.

Incidentally, the first conductor group 211 and the second conductor group 212 may be both arranged on the same side of the sensor substrate. Alternatively, the first conductor group 211 may be arranged on one side of the sensor substrate and the second conductor group 212 on the other side thereof.

The pen pointing detection circuit 203 includes a selection circuit 221 acting as an input/output interface with the sensor 202, an amplification circuit 222, a band-pass filter 223, a detection circuit 224, a sample hold circuit 225, an AD (Analog to Digital) conversion circuit 226, and a control circuit 220.

On the basis of control signals from the control circuit 220, the selection circuit 221 selects one conductor from the first conductor group 211 and one conductor from the second conductor group 212. The conductors selected by the selection circuit 221 are connected to the amplification circuit 222. The signal from the position indicator 1 is detected by the selected conductors and amplified by the amplification circuit 222. The output of the amplification circuit 222 is supplied to the band-pass filter 223 that extracts only the frequency component of the signal transmitted from the position indicator 1.

The output signal of the band-pass filter 223 is detected by the detection circuit 224. The output signal of the detection circuit 224 is supplied to the sample hold circuit 225. A sampling signal from the control circuit 220 causes the sample hold circuit 225 to sample and hold the supplied signal at a predetermined timing. The result of the sample hold operation is converted to a digital value by the AD conversion circuit 226. The digital data from the AD conversion circuit 226 is read and processed by the control circuit 220.

In keeping with programs stored in an internal ROM (read-only memory), the control circuit 220 acts to output control signals to the sample hold circuit 225, to the AD conversion circuit 226, and to the selection circuit 221. Given the digital data from the AD conversion circuit 226, the control circuit 220 calculates the coordinates of the position on the sensor 202 pointed by the position indicator 1 and obtains writing pressure information through demodulation. The control circuit 220 then outputs the position coordinate data and the writing pressure information to another processor in an electronic device such as a tablet type information terminal.

[Detection by the Position Detection Apparatus 201 of the Position Pointed by the Tip Part 6a of the Stylus 6 of the Position Indicator 1]

Figure 7A:
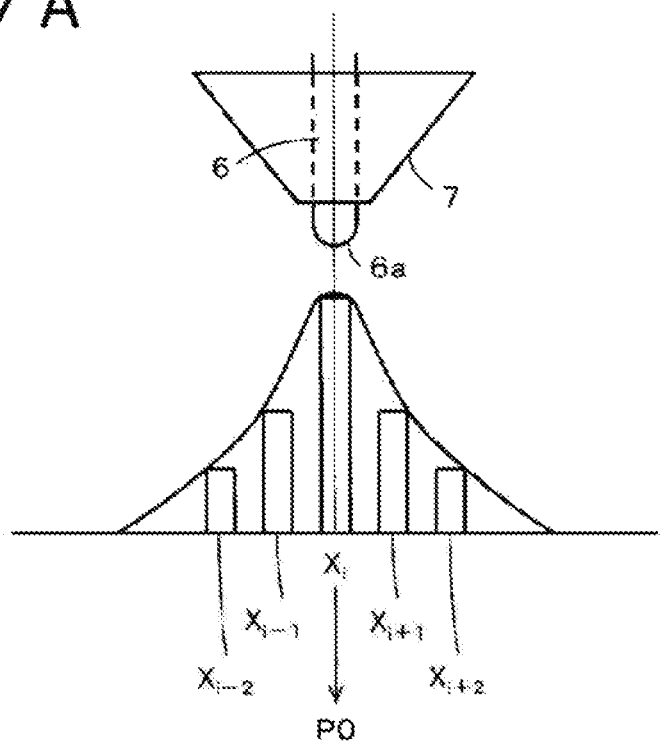
FIGS. 7A and 7B are views explaining how the signal is received by the position detection apparatus in a case where the position indicator as the first embodiment of the present disclosure is used.
Figure 7B:
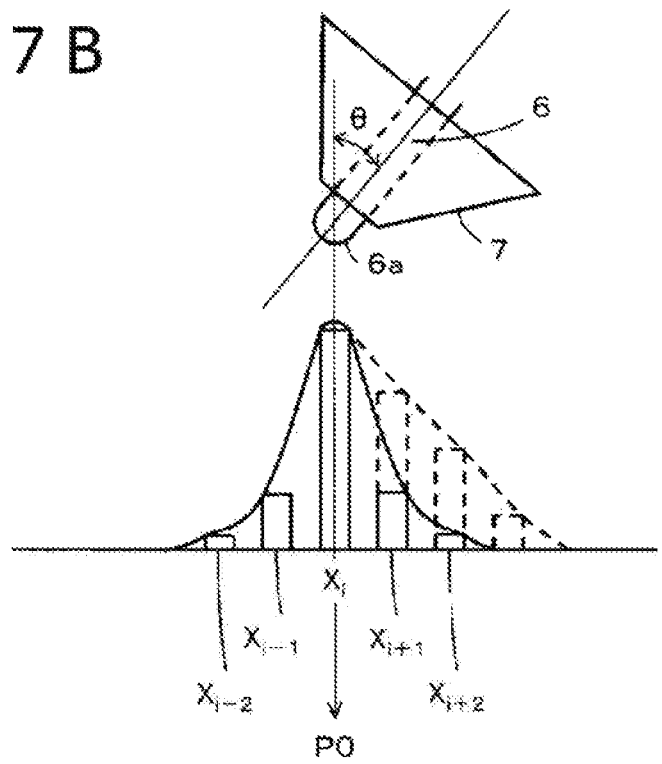
Figure 11A:
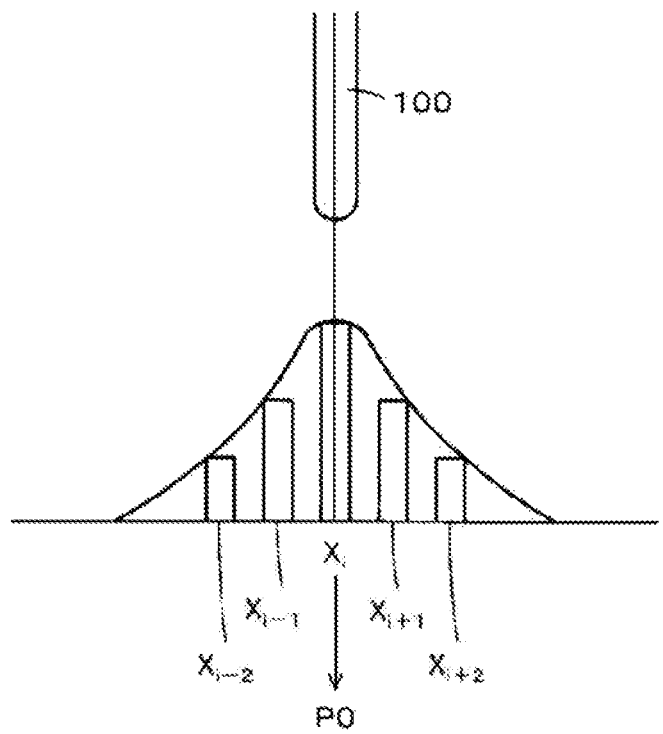
FIGS. 11A and 11B are views explaining how the signal is received by the position detection apparatus in a case where an existing position indicator is used.
Figure 11B:
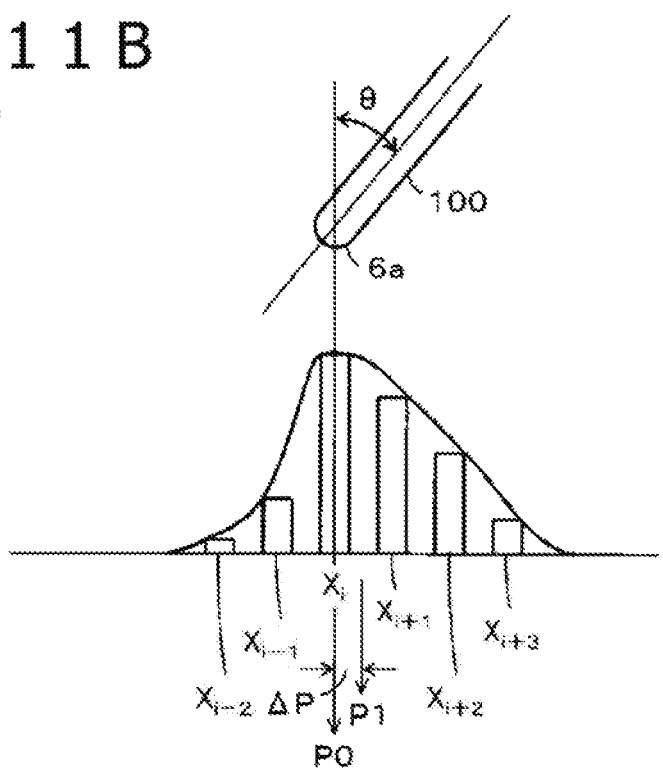

FIGS. 7A and 7B depicts how the tilt angle of the axial center direction of the stylus 6 of the position indicator 1 with respect to the input surface 201S of the sensor 202 is related to the signal levels of the signal received from the position indicator 1 by the sensor 202 of the position detection apparatus 201. Explained in FIGS. 7A and 7B, as in the above-described case of FIGS. 11A and 11B, are the signal levels of the signal received by multiple second conductors 212X arranged in the X-axis direction (e.g., crosswise direction) of the sensor 202 (in the example of FIGS. 7A and 7B, conductors Xi−2, Xi−1, Xi, Xi+1, and Xi+2). The same applies to the first conductors 212Y arranged in the Y-axis direction.

FIG. 7A illustrates the signal levels of the signal received by the second conductors Xi−2, Xi−1, Xi, Xi+1, and Xi+2 in a case where the axial center direction of the stylus 6 of the position indicator 1 is perpendicular to the input surface 201S of the sensor 202 of the position detection apparatus 201 and where the tip part 6a of the stylus 6 is directly above the second conductor Xi, with the conductors Xi−2, Xi−1, Xi+1 and Xi+2 positioned nearby.

In this case, the signal from the stylus 6 is transmitted substantially from the tip part 6a of the stylus 6 to the sensor 202, with the ring electrode 7 outputting the opposite-phase signal to the sensor 202. Consequently, as in the case of FIG. 11A, the signal level of the signal received by each of the second conductors Xi−2, Xi−1, Xi, Xi+1 and Xi+2 is highest on the second conductor Xi at the center and is progressively lower on the second conductors Xi−2 and Xi−1 to the left of the second conductor Xi and on the second conductors Xi+1 and Xi+2 to the right thereof in a symmetrical manner.

In this case, however, due to the opposite-phase signal from the ring electrode 7, the second conductors Xi−2 and Xi−1 to the left side of the second conductor Xi and the second conductors Xi+1 and Xi+2 to the right side thereof have their signal levels decreasing more steeply than in the case of FIG. 11A. This makes the signal level on the second conductor Xi relatively higher than in the case of the existing position indicator depicted in FIGS. 11A and 11B.

The position detection apparatus calculates the position on the sensor pointed by the tip part 6a of the stylus 6, using the received signal levels of the second conductors Xi−2, Xi−1, Xi, Xi+1 and Xi+2. In this case, the position pointed by the tip part 6a of the stylus 6 is detected more suitably as the position P0 of the second conductor Xi. That is because the received signal level of the second conductor Xi is appreciably higher than those of the second conductors Xi−2 and Xi−1 to the left and those of the second conductor Xi+1 and Xi+2 to the right by an amount larger than in the case of FIG. 11A.

FIG. 7B depicts the signal levels of the signal received by the second conductors Xi−2, Xi−1, Xi, Xi+1, and Xi+2 in a case where the tip part 6a of the stylus 6 of the position indicator 1 is directly above the second conductor Xi but where the stylus 6 is tilted in the X-axis direction at an angle θ(θ<90 degrees) with respect to the input surface 201S of the sensor 202 of the position detection apparatus 201.

In this case, on the side of the direction in which the position indicator 1 is tilted, the ring electrode 7 approaches the input surface 201S of the sensor of the position detection apparatus 201. The signal from the stylus 6 is then transmitted to the sensor not only from the tip part 6a of the stylus 6 but also from other parts of the stylus 6 that are near the sensor in keeping with the tilt of the position indicator 1, as depicted in FIG. 11B. In this state, the signal component from the nearby parts of the stylus 6 (indicated by dotted lines in FIG. 7B) is cancelled out by the opposite-phase signal from the ring electrode 7.

As a result, the signal level of the signal received by each of the second conductors Xi−2, Xi−1, Xi, Xi+1 and Xi+2 is highest on the second conductor Xi at the center and represents on the second conductors Xi−2 and Xi−1 to the left of the second conductor Xi and on the second conductors Xi+1 and Xi+2 to the right thereof in a symmetrical manner, as illustrated by solid lines in FIG. 7B.

Consequently, the position detection apparatus detects the position on the sensor pointed by the tip part 6a of the stylus 6 as the position P0 of the second conductor Xi with a minimum of shift through calculations using the received signal levels of the second conductors Xi−2, Xi−1, Xi, Xi+1 and Xi+2, as in the case of FIG. 7A.

In the foregoing embodiment, it is explained that the ring electrode 7 is connected to the ground conductor via the coil 303. Alternatively, the ring electrode 7 may be connected to a terminal on which the power supply voltage VDD is made to appear. That is, it is sufficient to connect the ring electrode 7 to the reference potential via the coil 303.

Other Embodiments

In the foregoing first embodiment, the signal transmission control circuit 30 is configured to connect the ring electrode 7 to the reference potential through the coil 303 in order to output the signal that is opposite in phase to the signal output from the stylus 6. However, this configuration is not limitative of how the opposite-phase signal is to be output.

Figure 8:
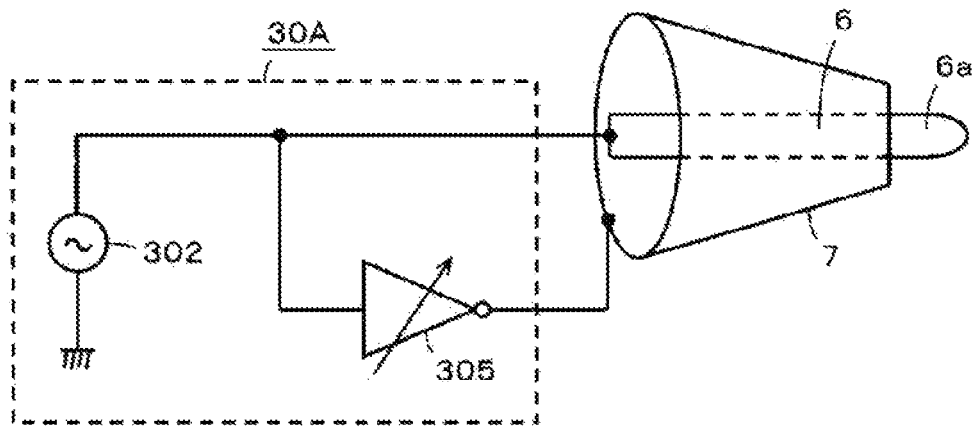
FIG. 8 depicts a view explaining a modification of the main section of the position indicator according to the present disclosure.

FIG. 8 depicts a first alternative example configured to cause the ring electrode 7 to output the signal opposite in phase to the signal output from the stylus 6. The signal transmission control circuit 30A in this first example does not include the coil 303 to be connected with the ring electrode 7. Instead, the first embodiment is modified to include a polarity inversion amplifier 305 that supplies the stylus 6 with the signal from the oscillation circuit 302 while acting as an opposite-phase signal generation circuit for generating the signal opposite in phase to the signal from the oscillation circuit 302. The polarity inversion amplifier 305 inverts the signal from the oscillation circuit 302 and supplies the inverted signal to the ring electrode 7. In this first example, the amplification gain of the polarity inversion amplifier 305 is adjusted to a value such that the position detection apparatus 201 can correctly detect the position pointed by the tip part 6a of the stylus 6.

Thus, also in the case of this first example, the signal opposite in phase to the signal from the stylus 6 is output from the ring electrode 7. This provides advantageous effects similar to those of the foregoing first embodiment.

Figure 9A:
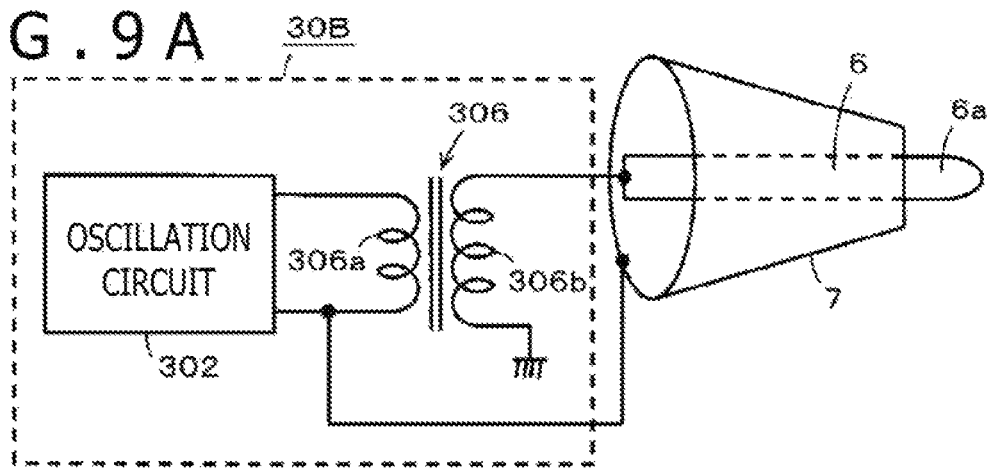
FIGS. 9A and 9B depict views explaining other modifications of the main section of the position indicator according to the present disclosure.
Figure 9B:
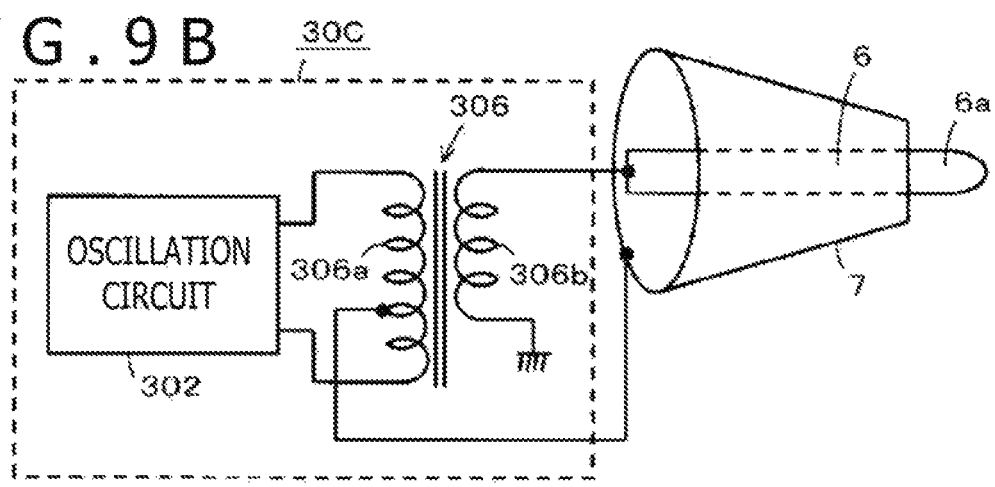

FIGS. 9A and 9B depict a second alternative example configured to constitute an opposite-phase signal generation circuit using a transformer 306. In this example, the ring electrode 7 outputs the signal opposite in phase to the signal from the stylus 6, without using the coil 303. In a signal transmission control circuit 30B of this second example, as depicted in FIG. 9A, the signal from the oscillation circuit 302 of the first embodiment is supplied to the stylus 6 via the transformer 306 that has a primary winding 306a and a secondary winding 306b. Also, the signal from the oscillation circuit 302 is supplied from the side of the primary winding 306a of the transformer 306.

FIG. 9B depicts a modification of the second example. In a signal transmission control circuit 30C in this modification of the second example, the primary winding 306a is provided with an intermediate tap, as depicted in FIG. 9B. The signal from the oscillation circuit 302 is arranged to be supplied from the intermediate tap of the primary winding 306a to the ring electrode 7. The position of the intermediate tap on the primary winding 306a may be adjusted in such a manner that the position detection apparatus 201 can correctly detect the position pointed by the tip part 6a of the stylus 6.

In the second example depicted in FIG. 9A and in the modification of the second example in FIG. 9B, the signal from the oscillation circuit 302 is supplied to the stylus 6 from the secondary winding 306b of the transformer 306 and to the ring electrode 7 from the primary winding 306a of the transformer 306. The signal output from the stylus 6 and the signal from the ring electrode 7 are thus opposite to each other in phase. This provides advantageous effects similar to those of the foregoing first embodiment.

Next, in the position indicator 1 of the foregoing embodiment, whenever the stylus 6 outputs the signal, the ring electrode 7 is arranged to output the signal opposite in phase to the signal from the stylus 6. This raises a possibility that the signal from the ring electrode 7 may lower the output intensity of the signal from the stylus 6.

Meanwhile, when the tip part 6a of the stylus 6 of the position indicator 1 is not in contact with, i.e., separated from, the input surface of the sensor of the position detection apparatus 201, the position detection apparatus 201 need not precisely detect the position pointed by the tip part 6a of the stylus 6 of the position indicator 1. In this state, the position detection apparatus 201 need only detect an appropriate position on the input surface of the sensor that the stylus 6 of the position indicator 1 has approached. Thus, the higher the output intensity of the signal from the position indicator, the better the result.

In view of the above, the ring electrode 7 may be arranged to output the signal opposite in phase to the signal from the stylus 6 only when the tip part 6a of the stylus 6 of the position indicator 1 is in contact with the input surface of the sensor for accurate detection of the position pointed by the tip part 6a of the stylus 6. When the tip part 6a of the stylus 6 of the position indicator 1 is not in contact with the input surface of the sensor, the ring electrode 7 may be arranged not to output the opposite-phase signal so as not to lower the output intensity of the signal output from the position indicator. Although not depicted, the amplitude level of the signal output from the stylus 6 and that of the signal from the ring electrode 7 may be adjusted in a manner maintaining an optimum amplitude level relation therebetween, as in the case of FIG. 8.

Figure 10:
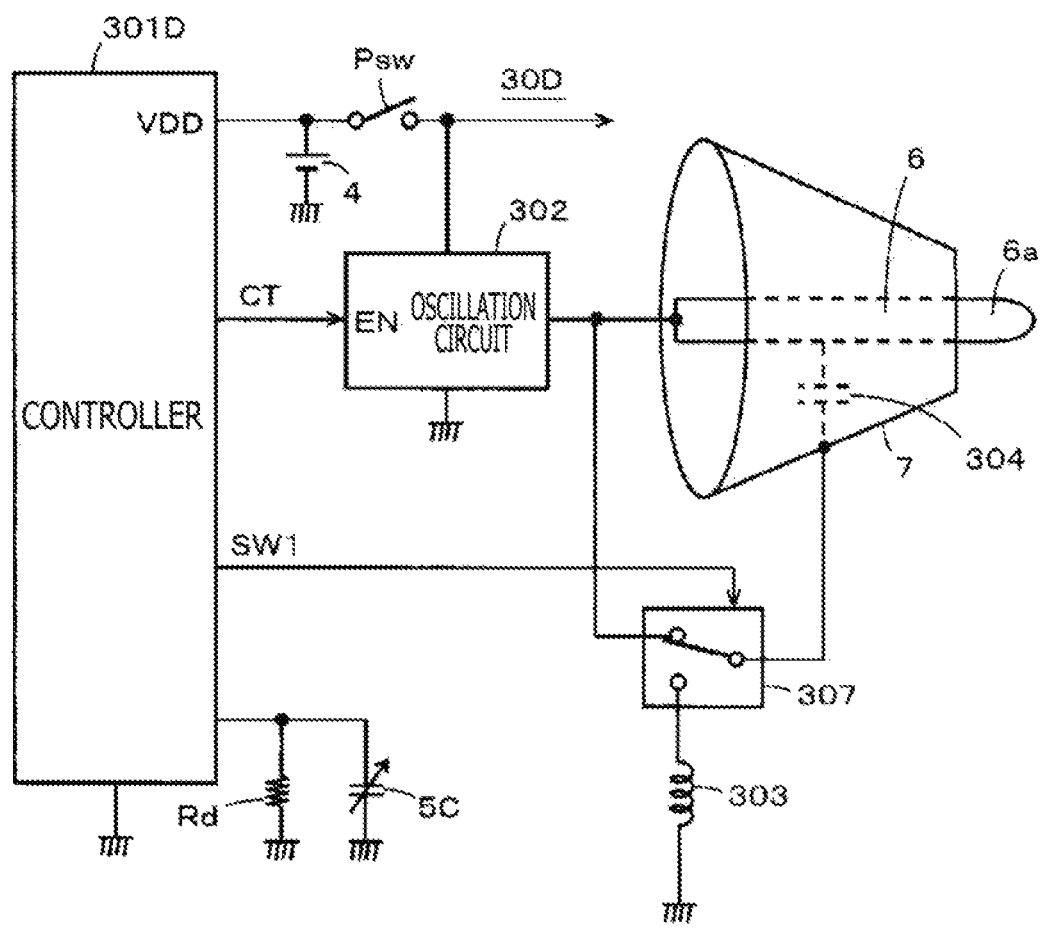
FIG. 10 is a view explaining the main section of another embodiment of the position indicator according to the present disclosure.

FIG. 10 depicts an exemplary circuit configuration of a signal transmission control circuit 30D in the position indicator 1 that takes into account what is discussed above. The signal transmission control circuit 30D in FIG. 10 is a modification of the above-described signal transmission control circuit 30 depicted in FIG. 3. The same components as those in the signal transmission control circuit 30 are designated by the same reference numerals and their explanations are omitted.

In this example, a switch circuit 307 as a typical control circuit is connected to the ring electrode 7. The signal from the oscillation circuit 302 is supplied not only to the stylus 6 but also to one fixed terminal of the switch circuit 307. Another fixed terminal of the switch circuit 307 is grounded via the coil 303. A movable terminal of the switch circuit 307 is connected to the ring electrode.

A controller 301D of this example detects the writing pressure applied to the stylus 6 of the position indictor 1 by monitoring the capacitance of the variable capacitance capacitor 5C constituted by the writing pressure detector 5. Given the result of detection of the writing pressure, the controller 301D determines whether or not the tip part 6a of the stylus 6 is in contact with the input surface of the sensor of the position detection apparatus 201. On the basis of the result of the determination, the controller 301D generates a switching control signal SW1 for the switch circuit 307, and controls the switching operation of the switch circuit 307 as follows.

That is, when determining that there is no writing pressure applied to the stylus 6 and that the tip part 6a of the stylus 6 is therefore not in contact with the input surface of the sensor of the position detection apparatus 201, the controller 301D generates the switching control signal SW1 such as to set the switch circuit 307 to the fixed terminal to which the signal from the oscillation circuit 302 is supplied. At this point, the coil 303 is disconnected from the ring electrode 7 so that the ring electrode 7 does not output the signal opposite in phase to the signal from the stylus 6. The ring electrode 7 thus outputs the signal in phase with the signal from the stylus 6. This enables the position detection apparatus 201, given the signals from the stylus 6 and from the ring electrode 7, to detect an approaching tip part 6a of the stylus 6 of the position indicator 1 with higher sensitivity than if only the signal from the stylus 6 is monitored.

Upon determining that the writing pressure applied to the stylus 6 is detected and that the tip part 6a of the stylus 6 is therefore in contact with the input surface of the sensor of the position detection apparatus 201, the controller 301D generates the switching control signal SW1 such as to set the switch circuit 307 to the fixed terminal with which the coil 303 is connected. At this point, as in the case of the first embodiment, the coil 303 is connected to the ring electrode 7. In this state, the ring electrode 7 outputs the signal opposite in phase to the signal from the stylus 6. This makes it possible suitably to detect the position of the tip part 6a of the stylus 6 of the position indicator 1 even if the position indicator 1 is tilted relative to the input surface of the sensor.

The control circuit in the example of FIG. 10 has the switch circuit 307 configured for switching control using the switching control signal SW1. Alternatively, a first switch circuit may be interposed between the ring electrode 7 and the coil 303 and a second switch circuit between the oscillation circuit 302 and the ring electrode 7. With this configuration, upon determining that the tip part 6a of the stylus 6 is not in contact with the input surface of the sensor of the position detection apparatus 201, the controller 301D performs control to turn on the first switch circuit and turn off the second switch circuit. When determining that the tip part 6a of the stylus 6 is in contact with the input surface of the sensor of the position detection apparatus 201, the controller 301D performs control to turn off the first switch circuit and turn on the second switch circuit.

The example in FIG. 10 is an exemplary configuration in which the ring electrode 7 does not output the opposite-phase signal when the tip part 6a of the stylus 6 is determined to be not in contact with the input surface of the sensor of the position detection apparatus 201. The technical concept of the example in FIG. 10 can also be applied to the example in FIG. 8 in which the ring electrode 7 outputs the opposite-phase signal, as well as to the example depicted in FIGS. 9A and 9B.

Other Embodiments or Modifications

In the foregoing embodiment, the ring electrode 7 constituting the ring-like conductor has a conical shape that is tapered toward the tip part 6a of the stylus 6. However, the conical shape is not limitative of the appearance of the ring-like conductor. The point is that the ring-like conductor need only have a shape that encircles the circumference of the stylus 6, such as a cylindrical shape or a donut-like shape.

Also, the stylus 6 (center electrode) and the ring electrode 7 (peripheral electrode) need only have a phase relation configured to output the signals of which the phases are cancelled out, i.e., signals that are opposite to each other in phase. Thus, in the equivalent circuit of the signal transmission control circuit depicted in FIG. 4, for example, the signal supplied to the stylus 6 and the signal supplied to the ring electrode 7 may be replaced with each other.

Also in the foregoing embodiment, the information regarding the writing pressure applied to the stylus of the position indicator is output from the stylus 6 together with the position detection signal. Alternatively, wireless communication means complying with the Bluetooth (registered trademark) standard may be provided to the position indicator and to the position detection apparatus for wireless communication therebetween.

DESCRIPTION OF REFERENCE SYMBOLS

1 Position indicator
2 Housing
3 Printed circuit board
4 Battery
5 Writing pressure detector
6 Stylus
6a Tip part of stylus
7 Ring electrode
30 Signal transmission control circuit
301 Controller
302 Oscillation circuit
303 Coil
304 Stray capacitance
305 Polarity inversion amplifier
306 Transformer
307, 308 Switch circuit

The invention claimed is:

1. A position indicator comprising:
a housing;
a first electrode and a second electrode that are arranged at one end of the housing in an axial center direction thereof, wherein the second electrode encircles the first electrode, and the first electrode is partially exposed from the housing in the axial center direction of the housing; and
a signal transmission control circuit that includes an oscillation circuit configured to generate a first signal that is output from the first electrode and generate a second signal that is output from the second electrode, the first and second signals being configured to interact capacitively with a sensor of a position detection apparatus,
wherein the signal transmission control circuit is configured to simultaneously supply the first electrode with the first signal and supply the second electrode with the second signal, and
wherein a phase of the second signal output from the second electrode is opposite a phase of the first signal output from the first electrode, so that the second signal output from the second electrode affects interaction between the first electrode and the sensor of the position detection apparatus.

2. The position indicator according to claim 1, wherein the signal transmission control circuit, in operation, performs control to cause the first electrode and the second electrode to respectively output the first and second signals and further performs control to make an amplitude level of the first signal output from the first electrode and an amplitude level of the second signal output from the second electrode have a predetermined relationship therebetween.

3. The position indicator according to claim 1, wherein the second electrode is connected with an inductor that causes the phase of the second signal output from the second electrode to be opposite the phase of the first signal output from the first electrode.

4. The position indicator according to claim 1, wherein the signal transmission control circuit includes a pressure detection circuit configured to detect a pressure applied to a tip part of a stylus arranged at the one end of the housing and a control circuit configured to be connected with the second electrode, and the signal transmission control circuit, in operation, further supplies the second electrode via the control circuit with a third signal that is in phase with the first signal supplied to the first electrode in a state in which the pressure detection circuit does not detect the pressure applied to the tip part of the stylus.

5. The position indicator according to claim 4, wherein the control circuit, in operation, controls the second electrode to selectively output either the third signal that is in phase with the first signal output from the first electrode or the second signal having the phase that is opposite the phase of the first signal output from the first electrode.

6. A signal transmission method in a position indicator including a housing, a first electrode and a second electrode that are arranged at one end of the housing in an axial center direction thereof, the second electrode encircling the first electrode and the first electrode being partially exposed from the housing in the axial center direction of the housing, the signal transmission method comprising:

generating a second signal, the first and second signals being configured to interact capacitively with a sensor of a position detection apparatus;

simultaneously supplying the first electrode with the first signal and supplying the second electrode with the second signal;

outputting the first signal from the first electrode; and outputting the second signal from the second electrode, wherein a phase of the second signal output from the second electrode is opposite a phase of the first signal output from the first electrode, so that the second signal output from the second electrode affects interaction between the first electrode and the sensor of the position detection apparatus.

7. The signal transmission method according to claim 6, wherein:

the second electrode is connected with an inductor that causes the phase of the second signal output from the second electrode to be opposite the phase of the first signal output from the first electrode.

* * * * *

UNITED STATES PATENT AND TRADEMARK OFFICE
CERTIFICATE OF CORRECTION

| | | |
|---|---|---|
| PATENT NO. | : 11,061,515 B2 | Page 1 of 1 |
| APPLICATION NO. | : 16/828569 | |
| DATED | : July 13, 2021 | |
| INVENTOR(S) | : Yuji Katsurahira et al. | |

It is certified that error appears in the above-identified patent and that said Letters Patent is hereby corrected as shown below:

In the Claims

<u>In Claim 6, Column 15, Line 22 through Column 16, Line 1:</u>
"signal transmission method comprising:
generating a second signal, the first and second signals"

Should read:
--signal transmission method comprising:
generating a first signal;
generating a second signal, the first and second signals--.

Signed and Sealed this
Fifth Day of July, 2022

Katherine Kelly Vidal
*Director of the United States Patent and Trademark Office*